Patented June 29, 1943

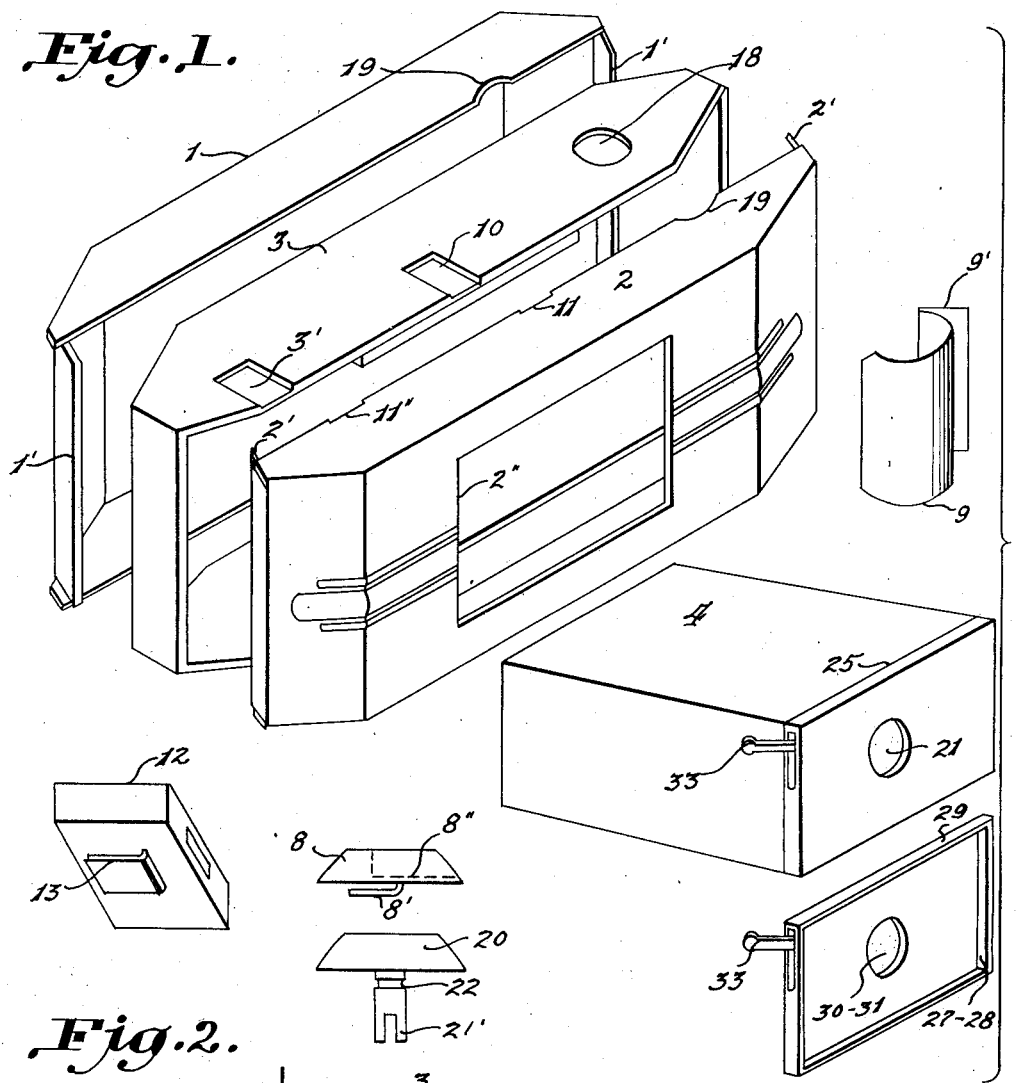
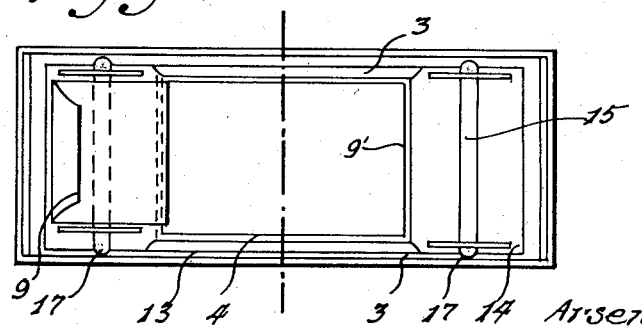

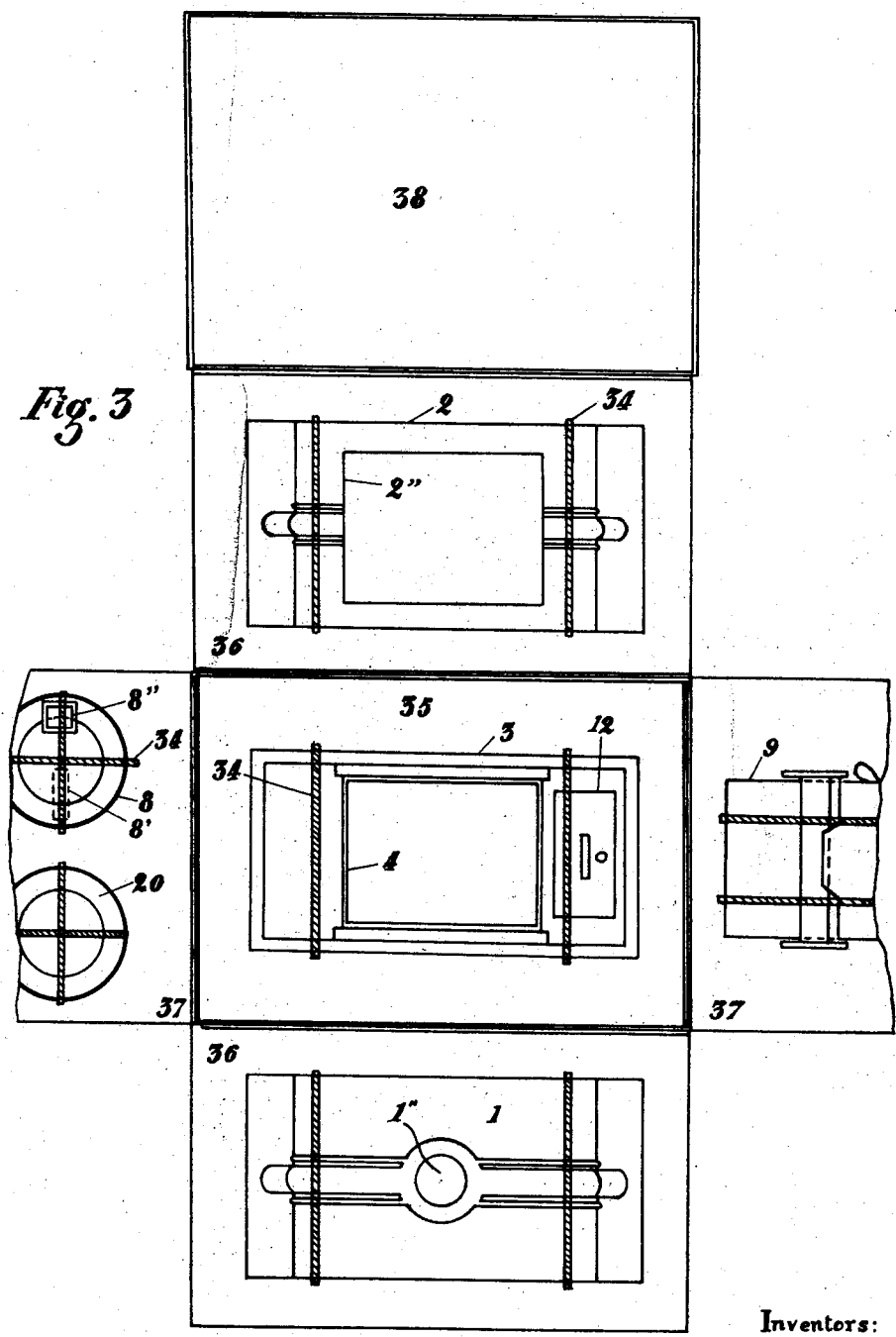

2,323,009

UNITED STATES PATENT OFFICE 2,323,009

PHOTOGRAPHIC APPARATUS IN DETACHED PARTS

Arsène Claudot and Arthur Mark, Jette St. Pierre, Belgium; vested in the Alien Property Custodian Application March 29, 1940, Serial No. 326,732 In Belgium October 20, 1939

5 Claims. (Cl. 95—31)

Conventionally all photographic apparatus, and particularly that in camera form, is sold in completely assembled relation, and the buyer is not conversant with the interior details, and the apparatus as a whole remains more or less—particularly to the amateur—in the nature of a mysterious mechanism.

The primary object of the present invention is to construct a photographic apparatus, and particularly a camera, with the respective parts thereof arranged for sale in knock-down relation, and constructed with a view to permit their conventional and ready assemblage into camera form, without the use of additional parts for such assemblage. When sold in this knockdown relation, the user, in assembling the parts, preferably of course under printed directions, requires an accurate and intimate knowledge of the necessary parts making up a camera, and thus understands the purpose of the respective parts and of the function they perform in their use in the camera assemblage.

The invention aims thus to not only arouse and increase the interest of photographers, and particularly the amateur in his camera, but will enable him to understand more exactly how the camera operates, with the particular advantage that any part of the construction according to the invention may, at will, be separated when damaged or worn and replaced by a new part.

The invention is illustrated in the accompanying drawings, in which

Figure 1 is a combined perspective view showing the various parts making up the camera in separated relation ready for convenient assemblage.

Figure 2 is a transverse section through the assembled camera.

Figure 3 is a broken plan view showing the various parts of the camera according to the present invention, mounted on the sections of a box so that they may be conveniently removed for assemblage.

In the present construction, the camera includes an outer box, including a rear section 1 and a front section 2, which, except in minor particulars to be noted, are of identical size and outline form. The end walls of the respective sections are provided with interfitting frictional holding flanges, those on the rear section 1 being indicated at 1' and those on the front section 2 being indicated at 2'. The sections 1 and 2 are designed to be arranged in alignment horizontally, with their relatively inner longitudinal edges in contact and the flanges 1' and 2' frictionally interfitting so as to hold the sections in box-forming relation.

A rectangular frame 3 of skeleton form, including end walls and top and bottom walls is of a size to fit snugly within the box, the side walls bearing against the flanges of the sections 1 and 2, and the top and bottom walls underlying and overlying the longitudinally meeting edges of the respective sections, to thus seal such meeting parts of the sections against light leakage. The front wall of the forward section 2 is formed with a rectangular opening 2'' and the casing 4 corresponding in dimensions to that in the opening is designed to be slidably fitted in that opening. The casing 4 is open at the respective ends, but otherwise sealed to provide a leak-proof light passage. The casing 4 is of less dimension longitudinally of the box than the similar dimension of the box, whereby a space is provided within the box and more particularly between the end walls of the frame 3 and the sides of the housing 4 as indicated at 14 and 15. The top and bottom walls of the frame 3 are provided with bearings indicated at 17 in Figure 2 to receive the spindles of the respective film spools, the film passing in rear of the casing 4 and being visible through an opening 1'' in the rear wall of the section 1 of the box, in order that the film may be visible to ensure its accurate position in adjustment as is well understood in cameras of this type. A spring guide 9 is provided to partly encircle the spool from which the film is fed, this guide having a flange 9' which may be secured in any conventional manner to the appropriate side of the casing 4 to receive the loaded spool.

The top of the box 3 is formed with an opening 18 to receive an element for winding the spool. This element as indicated more particularly in Figure 1, comprises a knob section 20 for a depending stem and corresponding with the opening 18 and terminally formed with a kerf 21' to fit over the upper end and spindle of the film spool in order to turn said spool for winding the film thereon. The stem depending from the handle portion 20 is formed with an annular depression 22, and the meeting edges of the sections 1 and 2 are formed in line with the depression, with semi-circular recesses 19 which fit into the depression and hold the winding element against endwise movement without interfering with its free rotation.

Adjacent one end the upper wall of the frame 3 is formed with a depression 3' and the immediately overlying edge of the section 2 of the box is formed with a notch 11". This arrangement provides a means for fixing, in a removable manner, the horizontal view finder which includes a body 8 provided at an appropriate point with a protected view aperture 8", the lower end of the body having an offset lip 8' which, when the parts are assembled, may be seated in the depression 3' and thus hold the view finder in place. The notch 11" permits the introduction of the end of the lip into the notch for the application of the view finder. A vertical view finder is also applied to the box through the medium of a recess 10 in the upper wall of the frame 3, and the corresponding notch 11 in the overlying edge of the section 2 of the box. This view finder, which is illustrated in Figure 1, and indicated at 12, is of box-like form, interiorly provided to afford a view of the object, and formed with an offset lip 13 adapted to be seated in the recess 10, as was the horizontal view-finder.

The forward end of the casing 4 is designed to receive two frames 27 and 28, one of which is fitted with a projecting edge 29 surrounding the frame and fitted to receive the other frame; opening 30—31 are formed in the respective frames and between the frames is mounted a conventional shutter of any appropriate design, the operating element of which is in the form of a lever 33, projecting through the wall of the combined frames.

The shutter-carrying element including the frames 27—28 is held at the forward end of the casing 4 by a cover plate 25, the marginal wall of which fits frictionally on the walls of the casing 4.

The cover plate is closed except for an opening 21 in line with the opening 30—31 of the shutter frame, which opening 21 is designed to be formed in any appropriate manner to receive and support any desired type of lens.

As the details of the lens are not important, such lens is not illustrated, it being understood, however, that by the arrangement described, the lens is removably supported in proper position in the cover plate and thus any particular lens used with the improved structure may, at will, be substituted by another type or make of lens, as may be desired.

The construction of the parts of the knockdown camera is particularly clear from Figure 1 of the drawings, and it will be understood from the above description how these parts may be assembled to form an effective, light-proof camera, in which the associated parts are connected without the use of screws or external fastenings of any type. Thus the user may, following printed directions if necessary, associate the parts to form his own camera; may select the type of lens he desires to employ, and also the character of shutter, if necessary.

As the connections between the parts are without extraneous fastening means, they may be not only readily assembled, but dismantled whenever necessary to renew or repair a part.

The invention preferably provides for packing of all detached parts of the apparatus a box with rigid walls, articulated mutually, as shown in Fig. 3, which represents the opened box flatly spread out, with all the different parts of apparatus maintained by elastics 34.

35 is the bottom of the box, 36 are the two large lateral walls, 37 are the two small walls and 38 is the cover provided with border on three of its free sides, in order to sustain the box assembled in closed position.

Having now fully described our said invention, what we claim and desire to secure by Letters Patent, is:

1. A knock-down photographic apparatus in the form of a camera, including a box, comprising substantially identical front and rear sections arranged in horizontal alignment with their adjacent edges in contact, interfitting frictionally engaging flanges carried by the sections to removably secure such sections in box-forming relation, a frame fitted within and bearing in contact with the inner surfaces of the top, bottom and sides of the box and fully covering the full juncture between the box sections to light-seal the meeting edges of the sections, an open-ended casing supported in the front section and passing through the frame, said casing defining with the frame film spool receiving chambers, a film spool in each chamber and supported solely by the frame, a shutter-engaging frame arranged at the forward end of the casing, and a cover securing the shutter frame removably to the casing, said cover being formed with a lens-receiving opening.

2. A construction as defined in claim 1 wherein the casing presents a light seal chamber intermediate the ends of the front and rear section of the box.

3. A construction as defined in claim 1 including an element for rotating one of the film spools and comprising a handle portion, a stem depending from an opening in the frame and engaging the film spool, said stem being formed with an annular recess of reduced diameter, and cooperating recesses formed in the meeting edges of the box sections to seat in said recess to prevent axial movement of the element.

4. A construction as defined in claim 1 including a view finder arranged above the top of the box and removably secured in position between the frame and one of the box sections.

5. A construction as defined in claim 1 including a view finder having an offset lip, a recess in the upper wall of the frame to permit the lip to be engaged between the bottom of the recess and the top wall of one of the sections, the cooperating section being formed with a notch to permit the introduction of the lip.

ARSÈNE CLAUDOT.
ARTHUR MARK.